US006678248B1

(12) United States Patent
Haddock et al.

(10) Patent No.: US 6,678,248 B1
(45) Date of Patent: Jan. 13, 2004

(54) POLICY BASED QUALITY OF SERVICE

(75) Inventors: Stephen R. Haddock, Los Gatos, CA (US); Justin N. Chueh, Palo Alto, CA (US); Shehzad T. Merchant, Mountain View, CA (US); Andrew H. Smith, Palo Alto, CA (US); Michael Yip, Sunnyvale, CA (US)

(73) Assignee: Extreme Networks, Santa Clara, CA (US)

( * ) Notice: Subject to any disclaimer, the term of this patent is extended or adjusted under 35 U.S.C. 154(b) by 772 days.

(21) Appl. No.: 09/597,878

(22) Filed: Jun. 20, 2000

Related U.S. Application Data

(63) Continuation of application No. 09/018,103, filed on Feb. 3, 1998, now Pat. No. 6,104,700.
(60) Provisional application No. 60/057,371, filed on Aug. 29, 1997.

(51) Int. Cl.$^7$ .............................................. H04L 12/56
(52) U.S. Cl. ...................... 370/235; 370/412; 370/429
(58) Field of Search ................................ 370/235, 412, 370/429

(56) References Cited

U.S. PATENT DOCUMENTS

| | | |
|---|---|---|
| 5,381,413 A | 1/1995 | Tobagi et al. |
| 5,394,402 A | 2/1995 | Ross .......................... 370/94.1 |
| 5,499,238 A | 3/1996 | Shon .......................... 370/60.1 |
| 5,570,360 A | 10/1996 | Klausmeier et al. ......... 370/412 |
| 5,629,937 A | 5/1997 | Hayter et al. ............... 370/412 |
| 5,742,772 A | 4/1998 | Sreenan .................. 395/200.56 |
| 5,748,614 A | 5/1998 | Wallmeier ................... 370/412 |
| 5,796,719 A | 8/1998 | Peris et al. .................. 370/418 |
| 5,850,399 A | 12/1998 | Ganmukhi et al. .......... 370/412 |
| 5,859,835 A | 1/1999 | Varma et al. ................ 370/412 |

OTHER PUBLICATIONS

International Search Report, PCT/US98/17817, 4 pages.

*Primary Examiner*—Melvin Marcelo
(74) *Attorney, Agent, or Firm*—Blackely Sokoloff Taylor & Zafman LLP

(57) ABSTRACT

A flexible, policy-based, mechanism for managing, monitoring, and prioritizing traffic within a network and allocating bandwidth to achieve true quality of service (QoS) is provided. According to one aspect of the present invention, a method is provided for managing bandwidth allocation in a network that employs a non-deterministic access protocol, such as an Ethernet network. A packet forwarding device receives information indicative of a set of traffic groups, such as: a MAC address, or IEEE 802.1p priority indicator or 802.1Q frame tag, if the QoS policy is based upon individual station applications; or a physical port if the QoS policy is based purely upon topology. The packet forwarding device additionally receives bandwidth parameters corresponding to the traffic groups. After receiving a packet associated with one of the traffic groups on a first port, the packet forwarding device schedules the packet for transmission from a second port based upon bandwidth parameters corresponding to the traffic group with which the packet is associated. According to another aspect of the present invention, a method is provided for managing bandwidth allocation in a packet forwarding device. The packet forwarding device receives information indicative of a set of traffic groups. The packet forwarding device additionally receives information defining a QoS policy for the traffic groups. After a packet is received by the packet forwarding device, a traffic group with which the packet is associated is identified. Subsequently, rather than relying on an end-to-end signaling protocol for scheduling, the packet is scheduled for transmission based upon the QoS policy for the identified traffic group.

28 Claims, 5 Drawing Sheets

POLICY BASED QUALITY OF SERVICE

This is a continuation of application Ser. No. 09/018,103, filed on Feb. 3, 1998, now issued U.S. Pat. No. 6,104,700.

This application claims the benefit of U.S. Provisional Application No. 60/057,371, filed Aug. 29, 1997.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking devices. More particularly, the invention relates to a flexible, policy-based mechanism for managing, monitoring, and prioritizing traffic within a network and allocating bandwidth to achieve true Quality of Service (QoS).

2. Description of the Related Art

Network traffic today is more diverse and bandwidth-intensive than ever before. Today's intranets are expected to support interactive multimedia, full-motion video, rich graphic images and digital photography. Expectations about the quality and timely presentation of information received from networks is higher than ever. Increased network speed and bandwidth alone will not satisfy the high demands of today's intranets.

The Internet Engineering Task Force (IETF) is working on a draft standard for the Resource Reservation Protocol (RSVP), an Internet Protocol-(IP) based protocol that allows end-stations, such as desktop computers, to request and reserve resources within and across networks. Essentially, RSVP is an end-to-end protocol that defines a means of communicating the desired Quality of Service between routers. RSVP is receiver initiated. The end-station that is receiving the data stream communicates its requirements to an adjacent router and those requirements are passed back to all intervening routers between the receiving end-station and the source of the data stream and finally to the source of the data stream itself. Therefore, it should be apparent that RSVP must be implemented across the whole network. That is, both end-stations (e.g., the source and destination of the data stream) and every router in between should be RSVP compliant in order to accommodate the receiving end-station's request.

While RSVP allows applications to obtain some degree of guaranteed performance, it is a first-come, first-served protocol, which means if there are no other controls within the network, an application using RSVP may reserve and consume resources that could be needed or more effectively utilized by some other mission-critical application. A further limitation of this approach to resource allocation is the fact that end-stations and routers must be altered to be RSVP compliant. Finally, RSVP lacks adequate policy mechanisms for allowing differentiation between various traffic flows. It should be appreciated that without a policy system in place, the network manager loses control.

Recent attempts to facilitate traffic differentiation and prioritization include draft standards specified by the Institute of Electrical and Electronics Engineers (IEEE). The IEEE 802.1Q draft standard provides a packet format for an application to specify which Virtual Local Area Network (VLAN) a packet belongs to and the priority of the packet. The IEEE 802.1p committee provides a guideline to classify traffic based on a priority indicator in an 802.1Q frame tag. This allows VLANs to be grouped into eight different traffic classes or priorities. The IEEE 802.1p committee does not, however, define the mechanism to service these traffic classes.

What is needed is a way to provide true Quality of Service ("QoS") in a network employing a non-deterministic access protocol, such as an Ethernet network, that not only has the ability to prioritize and service different traffic classes, but additionally provides bandwidth management and guarantees a quantifiable measure of service for packets associated with a particular traffic class. More specifically, with respect to bandwidth management, it is desirable to employ a weighted fair queuing delivery schedule which shares available bandwidth so that high priority traffic is usually sent first, but low priority traffic is still guaranteed an acceptable minimum bandwidth allocation. Also, it is desirable to centralize the control over bandwidth allocation and traffic priority to allow for QoS without having to upgrade or alter end-stations and existing routers as is typically required by end-to-end protocol solutions. Further, it would be advantageous to put the control in the hands of network managers by performing bandwidth allocation and traffic prioritization based upon a set of manager-defined administrative policies. Finally, since there are many levels of control a network manager may elect to administer, it is desirable to provide a variety of scheduling mechanisms based upon a core set of QoS profile attributes.

BRIEF SUMMARY OF THE INVENTION

A flexible, policy-based, mechanism for managing, monitoring, and prioritizing traffic within a network and allocating bandwidth to achieve true Quality of Service (QoS) is described. According to one aspect of the present invention, a method is provided for managing bandwidth allocation in a network that employs a non-determninistic access protocol. A packet forwarding device receives information indicative of a set of traffic groups. The packet forwarding device additionally receives parameters, such as bandwidth and priority parameters, corresponding to the traffic groups. After receiving a packet associated with one of the traffic groups on a first port, the packet forwarding device schedules the packet for transmission from a second port based upon parameters corresponding to the traffic group with which the packet is associated. Advantageously, in this manner, a weighted fair queuing schedule that shares bandwidth according to some set of rules may be achieved.

According to another aspect of the present invention, a method is provided for managing bandwidth allocation and traffic prioritization in a packet forwarding device. The packet forwarding device receives information indicative of a set of traic groups. The packet forwarding device additionally receives information defining a Quality of Service (QoS) policy for the traffic groups. After a packet is received by the packet forwarding device, a traffic group with which the packet is associated is identified. Subsequently, rather than relying on an end-to-end signaling protocol for scheduling, the packet is scheduled for transmission based upon the QoS policy for the identified traffic group. Therefore, bandwidth allocation and traffic prioritization are based upon a set of administrative policies over which the network manager retains control.

According to yet another aspect of the present invention, a number of QoS queues are provided at each port of the packet forwarding device. A current bandwidth metric is determined for each of the QoS queues for a particular port. The QoS queues are divided into two groups based upon their respective bandwidth metrics and their respective minimum bandwidth requirements. Subsequently, the groups are used as a first level arbitration mechanism to select a QoS queue that will source the next packet.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A flexible, policy-based, mechanism for managing, monitoring, and prioritizing traffic within a network and allocating bandwidth to achieve true Quality of Service (QoS) is described. "Quality of Service" in this context essentially means that there is a quantifiable measure of the service being provided. The measure of service being provided may be in terms of a packet loss rate, a maximum delay, a committed minimum bandwidth, or a limited maximum bandwidth, for example.

In the present invention, a number of QoS queues may be provided at each port of a packet forwarding device, such as a Local Area Network (LAN) switch. Based upon a set of QoS parameters, various types of traffic can be distinguished and associated with particular QoS queues. For example, packets associated with a first traffic group may be placed onto a first QoS queue and packets associated with another traffic group may be placed onto a second QoS queue. When a port is ready to transmit the next packet, a scheduling mechanism may be employed to select which QoS queue of the QoS queues associated with the port will provide the next packet for transmission.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software. While, embodiments of the present invention will be described with reference to a high speed Ethernet switch, the method and apparatus described herein are equally applicable to other types of network devices or packet forwarding devices.

An Exemplary Switch Architecture

Figure 1A:
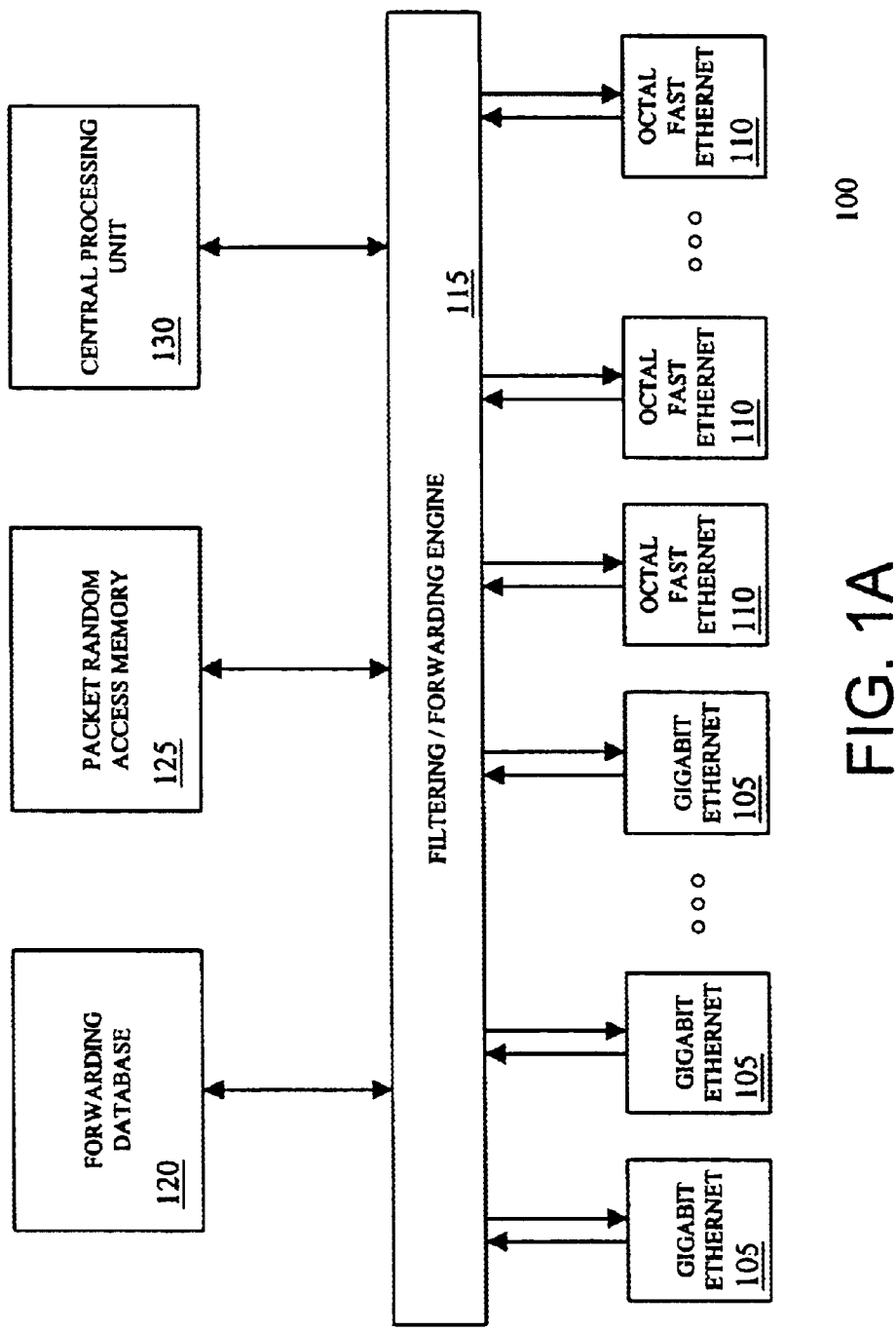
FIG. 1A is a simplified block diagram of an exemplary switch architecture in which one embodiment of the present invention may be implemented.

An overview of the architecture of a switch 100 in which one embodiment of the present invention may be implemented is illustrated by FIG. 1A. The central memory architecture depicted includes multiple ports 105 and 110 each coupled via a channel to a filtering/forwarding engine 115. Also coupled to the filtering/forwarding engine 115 is a forwarding database 120, a packet Random Access Memory (RAM) 125, and a Central Processing Unit (CPU) 130.

According to one embodiment, each channel is capable of supporting a data transfer rate of one gigabit per second in the transmit direction and one gigabit per second in the receive direction, thereby providing 2 Gb/s full-duplex capability per channel. Additionally, the channels may be configured to support one Gigabit Ethernet network connection or eight Fast Ethernet network connections.

The filtering/forwarding engine 115 includes an address filter (not shown), a switch matrix (not shown), and a buffer manager (not shown). The address filter may provide bridging, routing, Virtual Local Area Network (VLAN) tagging functions, and traffic classification. The switch matrix connects each channel to a central memory such as packet RAM 125. The buffer manager controls data buffers and packet queue structures and controls and coordinates accesses to and from the packet RAM 125.

The forwarding database 120 may store information useful for making forwarding decisions, such as layer 2 (e.g., Media Access Control (MAC) layer), layer 3 (e.g., Network layer), and/or layer 4 (e.g., Transport layer) forwarding information, among other things. The switch 100 forwards a packet received at an input port to an output port by performing a search on the forwarding database using address information contained within the header of the received packet. If a matching entry is found, a forwarding decision is constructed that indicates to which output port the received packet should be forwarded, if any. Otherwise, the packet is forwarded to the CPU 130 for assistance in constructing a forwarding decision.

The packet RAM 125 provides buffering for packets and acts as an elasticity buffer for adapting between incoming and outgoing bandwidth differences. Packet buffering is discussed further below.

Logical View of Exemplary Switch Processing

Figure 1B:
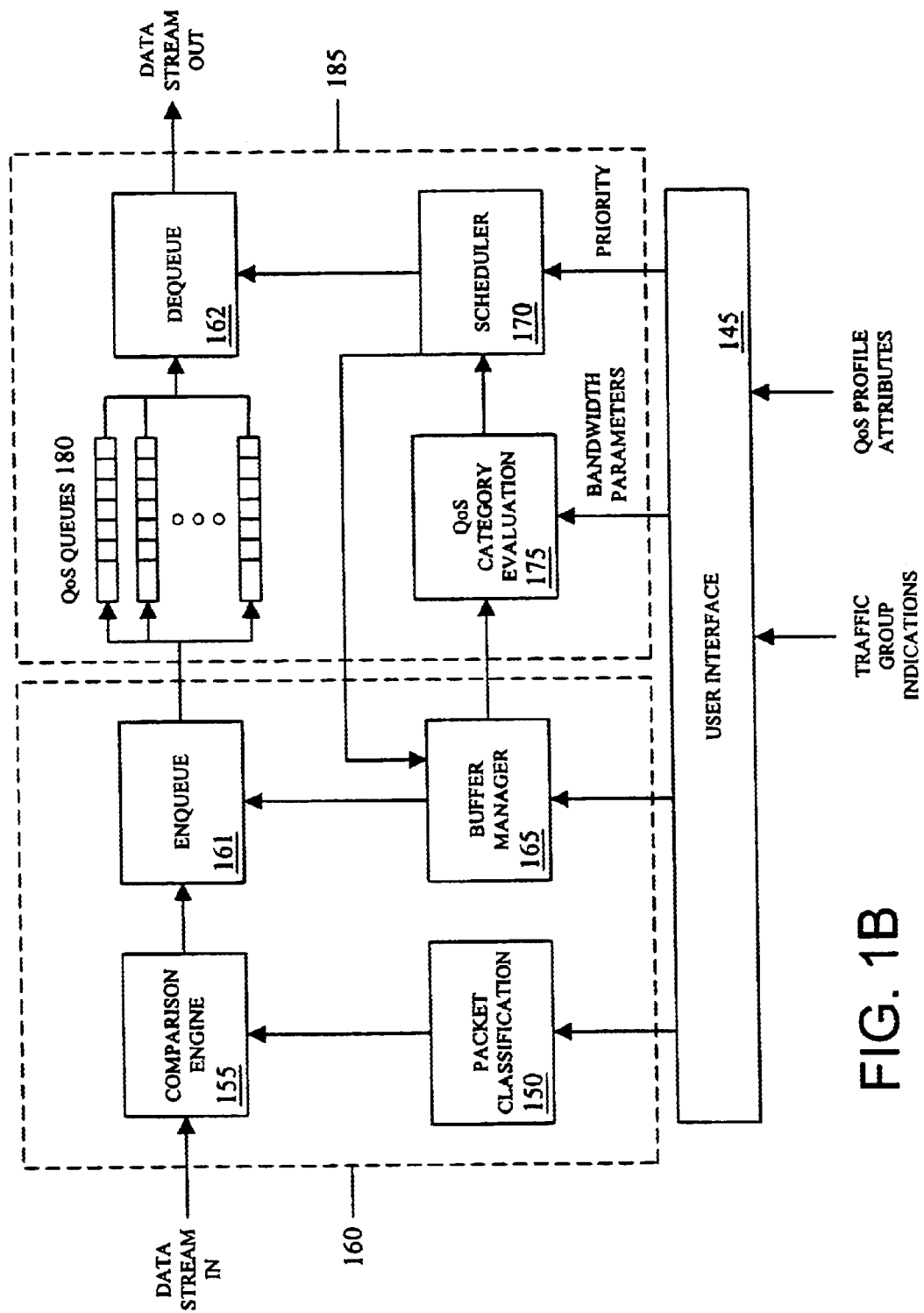
FIG. 1B is a logical view of the interaction between switch processing blocks according to one embodiment of the present invention.

FIG. 1B is a logical view of the interaction between exemplary switch processing blocks that may be distributed throughout the switch 100. For example, some of the processing may be performed by functional units within the ports of the switch and other processing may be performed by the CPU 130 or by the address filter/switch matrix/buffer manager 115. In any event, the processing can be conceptually divided into a first group of functions 160 dedicated to input processing and a second group of functions 185 dedicated to output processing. According to the present embodiment, the first group 160 includes a comparison engine 155, an enqueue block 161, a packet classification block 150, and a buffer manager 165. The second group 185 includes a dequeue block 162, a Quality of Service (QoS) category evaluation block 175, and a scheduler 170.

Additionally, a user interface (UI) 145 may be provided for receiving various parameters from the network manager. The UI may be text based or graphical. In one embodiment, the UI 145 may include an in-band HyperText Markup Language (HTML) browser-based management tool which may be accessed by any standard web browser. In any event, the goal of the UI 145 is to separate high-level policy components, such as traffic grouping and QoS profiles from the details of the internal switch hardware. Thus, user configuration time is minimized and a consistent interface is provided to the user.

The UI 145 receives information indicative of one or more traffic groups. This information may be provided by the network manager. There are several ways to define a traffic group. Table 1 below illustrates a variety of traffic classification schemes that may be supported by the UI 145.

TABLE 1

| Policy Based Upon | Traffic Classification | |
|---|---|---|
| | Traffic Group Definition | OSI Layer |
| Applications | TCP Session UDP Session RSVP Flow | Transport Layer |
| Network Layer Topology or Groups of Users | Network Layer Protocol Subnet or IP Address VLAN Identifier | Network Layer |
| End-Station Applications | MAC Address 802.1p or 802.1Q | Link Layer |
| Physical Topology | Physical Port | Physical Layer |

The information used to identify a traffic group typically depends upon what terms the QoS policy is defined. If the QoS policy is based on applications, traffic groups may be differentiated at the Transport layer by Transmission Control Protocol (TCP) session or User Datagram Protocol (UDP) session. For example, the network manager may provide information indicative of TCP source and destination ports and IP source and destination addresses to identify traffic groups. However, if the QoS policy is based upon the Network layer topology or groups of users, traffic group definition may be more convenient by supplying information regarding the Network layer protocol, such as Internet Protocol (IP) or Internetwork Packet Exchange (IPX), the subnet or IP addresses, or VLAN identifiers. If the QoS policy is defined by end-station applications, then Media Access Control (MAC) addresses, IEEE 802.1p priority indications, or IEEE 802.1Q frames may be employed to identify traffic groups. Finally, if the QoS policy is physical topology based, physical port identifiers may be used to differentiate traffic groups.

It should be noted that Table 1 merely presents an exemplary set of traffic group identification mechanisms. From the examples presented herein, additional, alternative, and equivalent traffic grouping schemes and policy considerations will be apparent to those of ordinary skill in the art. For example, other state information may be useful for purposes of packet classification, such as the history of previous packets, the previous traffic load, the time of day, etc.

It is appreciated that traffic classifications based upon the traffic group definitions listed above may result in overlap. Should the network manager define overlapping traffic groups, the UI 145 may issue an error message and reject the most recent traffic group definition, the UI 145 may issue a warning message to the network manager and allow the more specific traffic group definition to override a conflicting general traffic group definition, or the UI 145 may be configured to respond in another manner.

A number of QoS queues 180 may be provided at each of the ports of a packet forwarding device. In one embodiment, a mapping of traffic groups to QoS queues 180 may be maintained. As traffic groups are provided by the network manager, the UI 145 updates the local mapping of traffic groups to QoS queues 180. This mapping process may be a one-to-one mapping of the traffic groups defined by the network manager to the QoS queues 180 or the mapping process may be more involved. For example, there may be more traffic groups than QoS queues 180, in which case, more than one traffic group will be mapped to a single QoS queue. Some consolidation rules for combining multiple traffic groups into a single QoS queue will be discussed below.

At any rate, by providing a layer of abstraction in this manner, the network manager need not be burdened with the underlying implementation details, such as the number of QoS queues per port and other queuing parameters. Another advantage achieved by this layer of abstraction between the traffic group definitions and the physical QoS queues is the fact that the UI 145 is now decoupled from the underlying implementation. Therefore, the UI 145 need not be updated if the hardware QoS implementation changes. For example, software providing for traffic group definition need not be changed simply because the number of QoS queues per port provided by the hardware changes.

The input data stream is received by the comparison engine 155 from input switch ports (not shown). Under the direction of the packet classification process 150, the comparison engine 155 determines with which of the previously defined traffic groups a packet in the data stream is associated. The packet classification block 150 may employ the traffic group indications provided by the network manager to provide the comparison engine 155 with information regarding locations and fields to be compared or ignored within the header of a received packet, for example. It should be appreciated if the comparison required for traffic classification is straightforward, such as in a conventional packet forwarding device, then the comparison engine 155 and the packet classification block 150 may be combined.

The packet classification block 150 in conjunction with the UI 145 provide a network manager with a flexible mechanism to control traffic prioritization and bandwidth allocation through the switch 100. Importantly, no end-to-end signaling protocol needs to be implemented by the network devices. For example, the end-station that is to receive the data stream need not reserve bandwidth on each of the intermediate devices between it and the source of the data stream. Rather, a packet forwarding device employing the present invention can provide some benefit to the network without requiring routers and/or end-stations to do anything in particular to identify traffic. Thus, traffic priority may be enforced by the switch 100 and QoS may be delivered to applications without altering routers or end-stations.

According to one embodiment, the buffer manager 165 participates in policy based QoS by controlling the allocation of buffers within the packet RAM 125. Buffers may be dynamically allocated to QoS queues 180 as needed, within constraints established by QoS profile attributes, which are discussed below. The buffer manager 165 may maintain several programmable variables for each QoS queue. For example, a Minimum Buffer Allocation and a Maximum Queue Depth may be provided for each QoS queue. The Minimum Buffer Allocation essentially reserves some minimum number of buffers in the packet RAM 125 for the QoS queue with which it is associated. The Maximum Queue Depth establishes the maximum number of buffers that can be placed on a given QoS queue. The buffer manager 165 also maintains a Current Queue Depth for each QoS queue to assure the maximum depth is not exceeded. For example, before allowing a buffer to be added to a given QoS queue, the buffer manager 165 may compare the Maximum Queue Depth to the Current Queue Depth to ensure the Maximum Queue Depth is not exceeded.

Variables are also maintained for tracking free buffers in the packet RAM 125. At initialization, a Buffers Free Count contains the total number of buffers available in the packet RAM 125 and a Buffers Reserved Count contains the sum of the minimum buffer allocations for the QoS queues 180. As packets are received they are stored in free buffers, and the Buffers Free Count is decremented by the number of buffers used for such storage. After the appropriate QoS queue has been identified the buffer manager 165 instructs the enqueue block 161 to add the packet to the QoS queue. The enqueue block 161 links the packet to the identified queue provided that the Current Queue Depth is less than the Maximum Queue Depth and either (1) the Current Queue Depth is less than the Minimum Buffer Allocation or (2) the Buffers Reserved Count is less than the Buffers Free Count. Therefore, if a QoS queue exceeds its reserve of buffers (e.g., Minimum Buffer Allocation), to the extent that additional buffers remain free, the QoS queue may continue to grow. Otherwise, the enqueue block 161 will discard the packet, the buffers are returned to the free pool, and the Buffers Free Count is increased by the number of buffers that would have been consumed by the packet. When a packet is successfully linked to a QoS queue, the Current Queue Depth for that QoS queue is increased by the number of buffers used by the packet. If, prior to the addition of the packet to the queue, the Current Queue Depth was less than the Minimum Buffer Allocation then the Buffers Reserved Count is decreased by the lesser of (1) the number of buffers in the packet or (2) the difference between the Current Queue Depth and the Minimum Buffer Allocation.

The QoS category evaluation process 175 separates the QoS queues into a plurality of categories based upon a set of bandwidth parameters. The scheduler 170 uses the grouping provided by the QoS category evaluation process 175 to select an appropriate QoS queue for sourcing the next packet for a particular port. The evaluation of QoS queue categories may be performed periodically or upon command by the scheduler 170, for example. Periodic evaluation of QoS categories and scheduling is discussed in further detail below.

Responsive to the scheduler 170 the dequeue block 162 retrieves a packet from a specified QoS queue. After the packet has been transmitted, the buffer variables are updated. The Buffers Free Count is increased and the Current Queue Depth is decreased by the number of buffers utilized to store the packet. If the resulting Current Queue Depth is less than the Minimum Buffer Allocation, then the Buffers Reserved Count is increased by the lesser of the number of buffers utilized to store the packet or the difference between the Current Queue Depth and the Minimum Buffer Allocation.

QoS Profile Attributes

Setting QoS policy is a combination of identifying traffic groups and defining QoS profiles for those traffic groups. According to one embodiment, each individual traffic group may be associated with a QoS profile. However, in alternative embodiments, multiple traffic groups may share a common QoS profile. Having described traffic group classification and identification above, QoS profile attributes (also referred to as parameters) will now be discussed.

Several queuing mechanisms may be implemented using one or more of the following parameters associated with a traffic group: (1) minimum bandwidth, (2) maximum bandwidth, (3) peak bandwidth, (4) maximum delay, and (5) relative priority. In general, the minimum, maximum, and peak bandwidth parameter may be expressed in Mbps, a percentage of total bandwidth, or any other convenient representation.

Minimum bandwidth indicates the minimum amount of bandwidth a particular traffic group needs to be provided over a defined time period. If the sum of the minimum bandwidths for all traffic groups defined is less than 100% of the available bandwidth, then the scheduling processing, discussed below, can assure that each traffic group will receive at least the minimum bandwidth requested.

Maximum bandwidth is the maximum sustained bandwidth the traffic group can realize over a defined time period. In contrast, peak bandwidth represents the bandwidth a traffic group may utilize during a particular time interval in excess of the maximum bandwidth. The peak bandwidth parameter may be used to limit traffic bursts for the traffic group with which it is associated. The peak bandwidth also determines how quickly the traffic group's current bandwidth will converge to the maximum bandwidth. By providing a peak bandwidth value that is much higher than the maximum bandwidth, if sufficient bandwidth is available, the maximum bandwidth will be achieved relatively quickly. In contrast, a peak bandwidth that is only slightly higher that the maximum bandwidth will cause the convergence to the maximum bandwidth to be more gradual.

Maximum delay specifies a time period beyond which further delay cannot be tolerated for the particular traffic group. Packets comprising the traffic group that are forwarded by the switch 100 are guaranteed not to be delayed by more than the maximum delay specified.

Relative priority defines the relative importance of a particular traffic group with respect to other traffic groups. As will be discussed further below, within the same QoS category, traffic groups with a higher priority are preferred over those with lower priorities.

This small set of parameters in combination with the variety of traffic classification schemes gives a network manager enormous control and flexibility in prioritizing and managing traffic flowing through packet forwarding devices in a network. For example, the QoS profile of a video traffic group, identified by UDP session, might be defined to have a high priority and a minimum bandwidth of 5 Mbps, while the QoS profile of an engineering traffic group, identified by VLAN, may be set to a second priority, a minimum bandwidth of 30 Mbps, a maximum bandwidth of 50 Mbps, and a peak bandwidth of 60 Mbps. Concurrently, the QoS profile of a World Wide Web (WWW) traffic group, identified by protocol (e.g., IP), may be set to have a low priority, a minimum bandwidth of 0 Mbps, a maximum bandwidth of 100%, and a peak bandwidth of 100%.

Consolidation Rules

It was mentioned earlier that multiple traffic groups may be mapped to a single QoS queue. This may be accomplished by maintaining an independent set of variables (e.g., minimum bandwidth, maximum bandwidth, peak bandwidth, maximum delay, and relative priority) for each QoS queue in addition to those already associated with each traffic group and following the general consolidation rules outlined below.

Briefly, when the mapping from traffic groups to QoS queues is one-to-one, the determination of a particular QoS queues' attributes is straightforward. The QoS queue's attributes simply equal the traffic group's attributes. However, when combining multiple traffic groups that do not share a common QoS profile onto a single QoS queue, the following general consolidation rules are suggested: (1) add minimum attributes of the traffic groups being combined to arrive at an appropriate minimum attribute for the target QoS queue (e.g., the QoS queue in which the traffic will be merged), (2) use the largest of maximum attributes to arrive at an appropriate value for a maximum attribute for the target QoS queue, and (3) avoid merging traffic groups that have different relative priorities. This last rule suggests the number of priority levels provided should be less than or equal to the number of QoS queues supported by the implementation to assure traffic groups with different priorities are not combined in the same QoS queue.

Importantly, when a network manager has determined that multiple traffic groups will share a common QoS profile, the consolidation rules need not apply, as the network manager has already, in effect, manually consolidated the parameters.

Bandwidth Management and Traffic Prioritization

Figure 2:
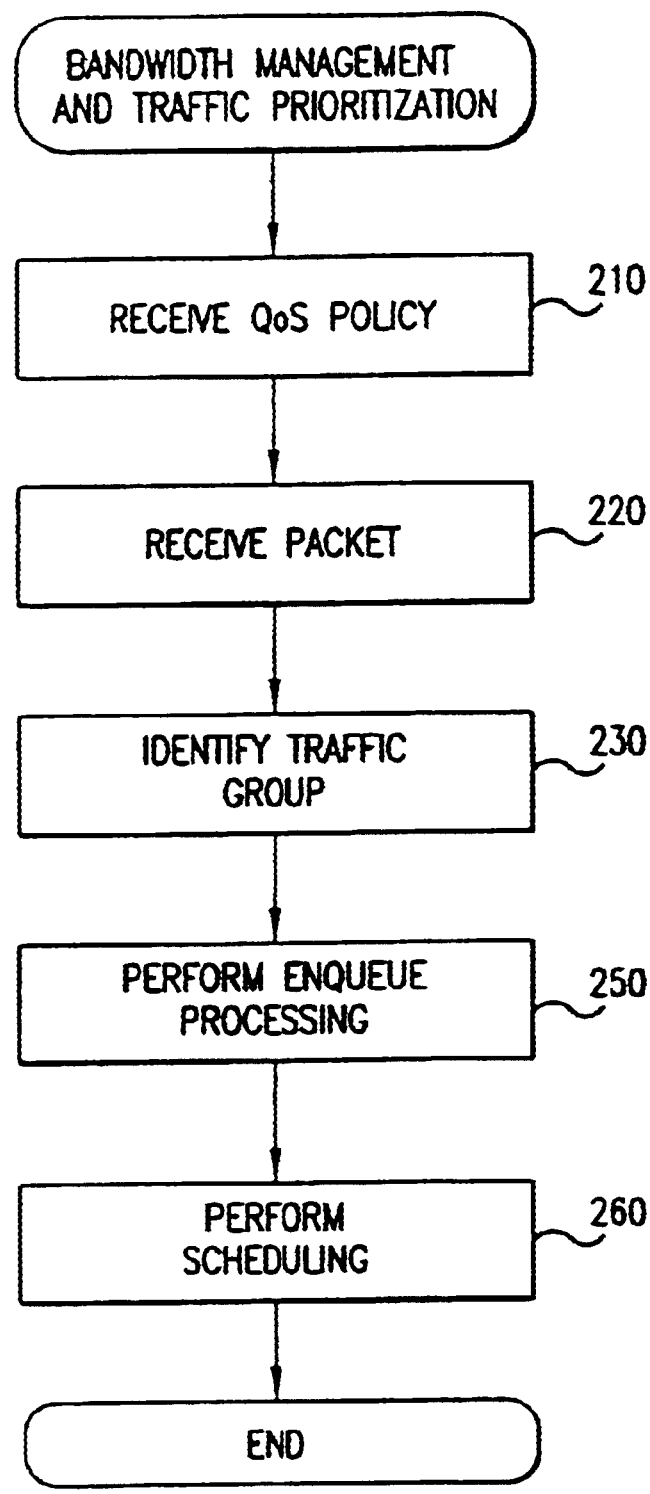
FIG. 2 is a flow diagram illustrating high level bandwidth management and traffic prioritization processing according to one embodiment of the present invention.

Having described an exemplary environment in which one embodiment of the present invention may be implemented, bandwidth management and traffic prioritization will now be described with reference to FIG. 2. FIG. 2 is a flow diagram illustrating the high level bandwidth management and traffic prioritization processing according to one embodiment of the present invention. In this embodiment, at step 210, a manager-defined QoS policy may be received via the UI 145, for example. The QoS policy is a combination of traffic groups and QoS profile attributes corresponding to those traffic groups.

At step 220, a packet is received by the switch 100. Before the packet can be placed onto a QoS queue for transmission, the traffic group to which the packet belongs is identified at step 230. Typically, information in the packet header, for example, can be compared to the traffic group criteria established by the network manager to identify the traffic group to which the packet belongs. This comparison or matching process may be achieved by programming filters in the switch 100 that allow classification of traffic. According to one embodiment, the packet may be identified using the traffic group definitions listed in Table 1.

At step 250, enqueue processing is performed. The packet is added to the rear of the appropriate QoS queue for the identified traffic group. Importantly, if a maximum delay has been assigned to the traffic group with which the packet is associated, then the packet should either be dropped or transmitted within the period specified. According to one embodiment, this may be accomplished by limiting the depth (also referred to as length) of the corresponding QoS queue. Given the minimum bandwidth of the QoS queue and the maximum delay the traffic group can withstand, a maximum depth for the QoS queue can be calculated. If the QoS queue length remains less than or equal to the maximum length, then the packet is added to the QoS queue. However, if the QoS queue length would exceed the maximum length by the addition, then the packet is dropped.

At step 260, scheduling is performed. The scheduling/dequeuing processing involves determining the appropriate QoS queue group, selecting the appropriate QoS queue within that QoS queue group, and removing the packet at the front of the selected QoS queue. This selected packet will be the next packet the port transmits. Scheduling will be discussed further below.

Evaluation of QoS Categories

According to one embodiment of the present invention, it is advantageous to divide the QoS queues into at least two categories. The categories may be defined based upon the maximum bandwidth, the minimum bandwidth, the peak bandwidth, and the "current bandwidth." The current bandwidth should not be mistaken for a bandwidth at an instant in time, rather the current bandwidth is a moving average that is updated periodically upon the expiration of a predetermined time period. Empirical data suggests this predetermined time period should be on the order of ten packet times, wherein a packet time is the time required to transmit a packet. However, depending upon the environment and the nature of the traffic, a value in the range of one to one hundred packet times may be more suitable.

The members of the first category ("Category A") are those QoS queues which have a current bandwidth that is below their peak bandwidth and below their minimum bandwidth. Members of the second category ("Category B") include those QoS queues that have a current bandwidth that is greater than or equal to their minimum bandwidth, but less than both their maximum bandwidth and their peak bandwidth. The remaining QoS queues (e.g., those having a current bandwidth that is greater than or equal to either the peak bandwidth or the maximum bandwidth) are ineligible for transmission. These QoS queues that are ineligible for transmission can be considered a third category ("Category C"). With this overview of QoS categories, an exemplary process for periodic evaluation of QoS categories will now be described.

Figure 3:
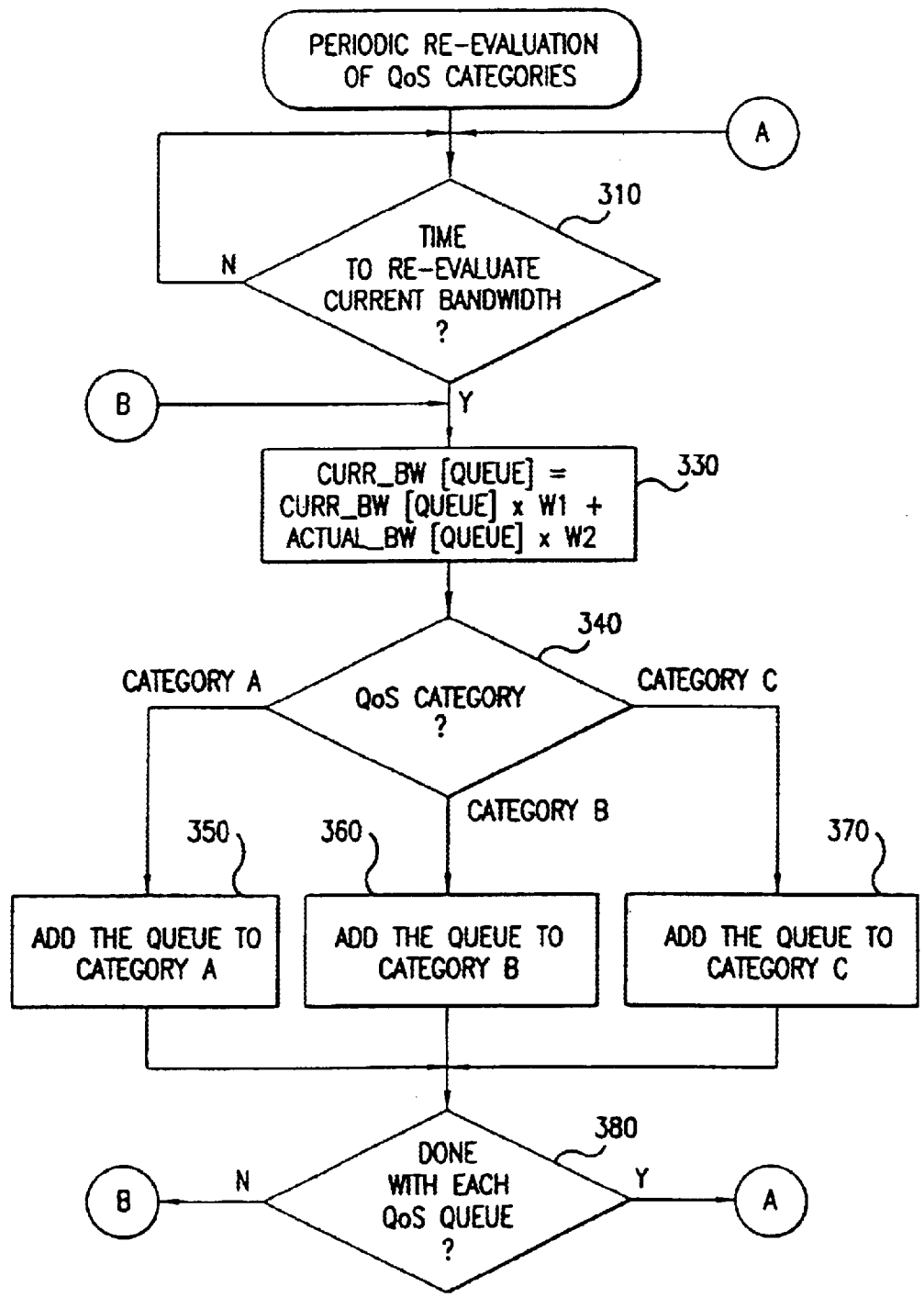
FIG. 3 is a flow diagram illustrating periodic evaluation of QoS categories according to one embodiment of the present invention.

FIG. 3 is a flow diagram illustrating periodic evaluation of QoS categories according to one embodiment of the present invention. In this embodiment, at step 310, processing loops until the predetermined evaluation time period has expired. For example, a test may be performed to determine if the current time is greater than or equal to the last evaluation time plus the predetermined evaluation time interval. Alternatively, the evaluation process may be triggered by an interrupt. In any event, when it is time to evaluate the QoS queue categorization, processing continues with step 330.

It will be appreciated that the time interval chosen for the predetermined evaluation time period should not be too long or too short. If the time interval is too long, one QoS queue might be allowed to monopolize the link until its maximum bandwidth is achieved while other QoS queues remain idle. If the time interval is too short, transmitting a single packet or remaining idle for a single packet time may cause the QoS queue to become a member of a different QoS category (e.g., the single transmission may cause the current bandwidth to exceed the maximum bandwidth or the single idle time may cause the current bandwidth to fall below the minimum bandwidth) because the moving average moves very quickly over short time intervals.

At step 330, the current bandwidth for a particular QoS queue is set to the current bandwidth for that QoS queue as calculated in the previous time interval multiplied by a first weighting factor plus the actual bandwidth that particular QoS queue received in the previous time interval multiplied by a second weighting factor, wherein the weighting factors may be selected to achieve the desired level of responsiveness in the current bandwidth metric. For example, it may be desirable to have the current bandwidth converge to within a certain percentage of a sustained bandwidth if that bandwidth has been sustained for a certain amount of time. Exemplary weighting factors are in the form (w−1)/w and 1/w, respectively. Using weighting factors of $15/16$ for the first weighting factor and a value of $1/16$ for the second weighting factor, for example, the current bandwidth will reflect 50% of a step within 13 time intervals, 80% of a step within 27 time intervals, and will be within 2% of the sustained bandwidth in approximately 63 time intervals (assuming a maximum and peak bandwidth of 100%). Alternative ratios and current bandwidth metrics will be apparent to those of ordinary skill in the art.

After the current bandwidth has been evaluated for a QoS queue, at step 340, the QoS queue bandwidth parameters can be compared to the current bandwidth to determine to which QoS category the QoS queue belongs. As described above, if (CURR_BW<PEAK_BW) and (CURR_BW<MIN_BW), then the QoS queue is associated with Category A at step 350. If (CURR_BW≧MIN_BW) and ((CURR_BW<MAX_BW) and (CURR_BW<PEAK_BW)), then the QoS queue is associated with Category B at step 360. If (CURR_BW≧PEAK_BW) or (CURR_BW≧MAX_BW), then the QoS queue is associated with Category C at step 370.

At step 380, if all of the QoS queues have been evaluated, then processing branches to step 310; otherwise, processing continues with step 330.

Scheduling Processing

Briefly, at each port, three levels of arbitration may be employed to select the appropriate QoS queue from which to transmit the next packet. The first level of arbitration selects among the QoS categories. Category A is given priority if any member QoS queues have one or more pending packets. Otherwise, a QoS queue with one or more pending packets of Category B is selected. According to one embodiment, the relative priority assigned to each QoS queue may be used as a second level of arbitriation. In this manner, when multiple QoS qLueLies satisfy the first level arbitration, a higher priority QoS queue is favored over a lower priority QoS queue. Finally, when there is a tie at the second level of arbitration (e.g., two or more QoS queues in the same QoS category have the same relative priority), a round robin or least recently used (LRU) scheme may be employed to select from among the two or more QoS queues until the QoS categories are evaluated.

Figure 4:
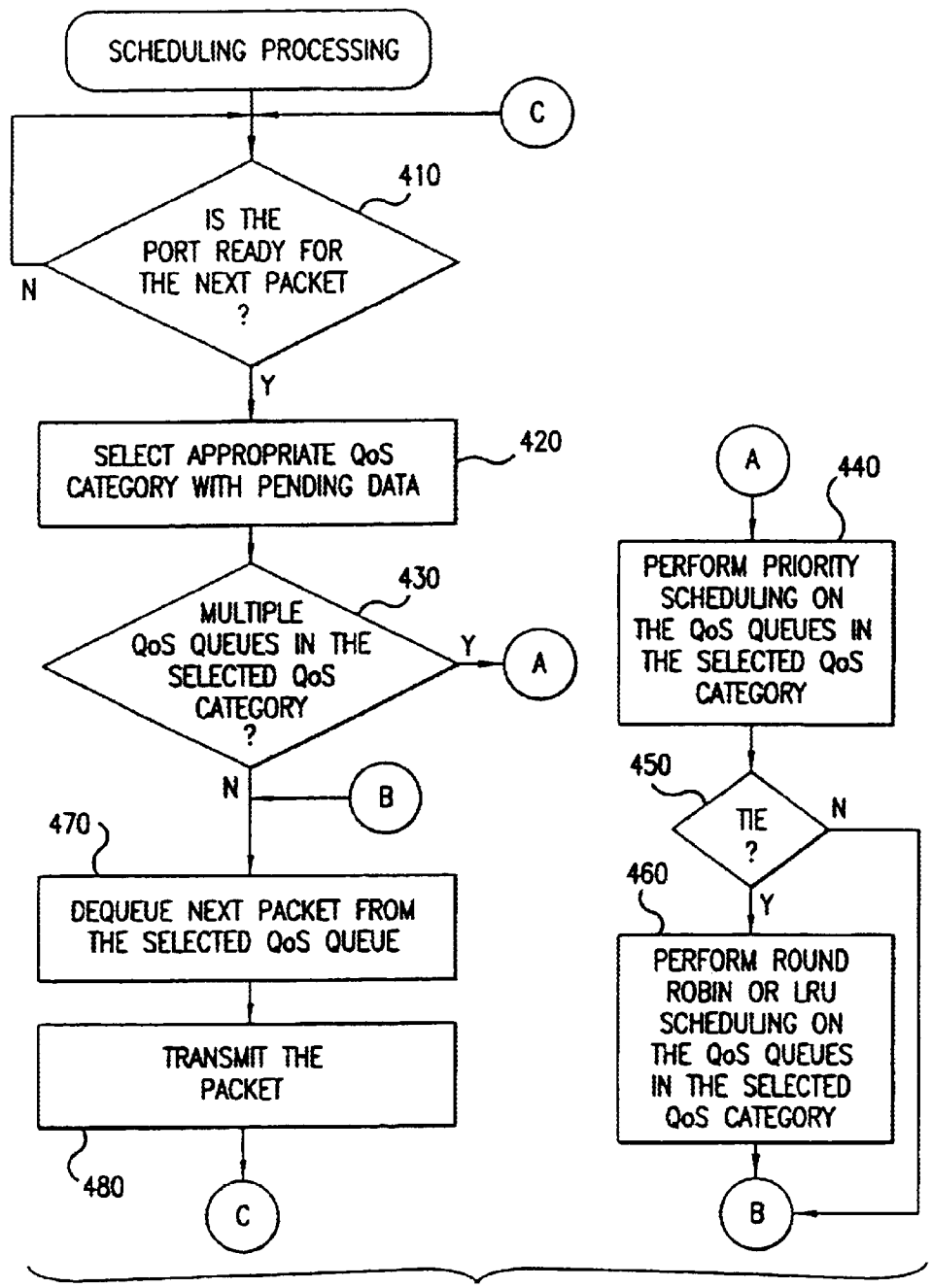
FIG. 4 is a flow diagram illustrating next packet scheduling according to one embodiment of the present invention.

Assuming a periodic evaluation of QoS categories is being performed, the scheduling processing need not include such evaluation and the scheduling processing may be performed as illustrated by FIG. 4, according to one embodiment of the present invention. In the embodiment depicted, at step 410, processing loops until the port associated with the group of QoS queues being evaluated indicates it is ready to receive the next packet for transmission. For example, the port may be polled to determine its transmission status. Alternatively, the scheduling process may be triggered by an interrupt. In any event, when the port is ready for the next packet, processing continues with step 420.

At step 420, a QoS category is selected from which a QoS queue will provide the next packet for transmission. As described above, priority is given to the category containing QoS queues with pending data that are below the peak bandwidth and minimum bandwidth (e.g., Category A). However, if no QoS queues meet this criteria, Category B is selected.

At step 430, if multiple QoS queues are members of the selected QoS category, processing continues with step 440, otherwise, processing branches to step 470.

At step 440, the relative priorities of the QoS queues are used to select among the QoS queues of the selected category that have pending data.

At step 450, it two or more QoS queues have the same priority, then processing continues with step 460. Otherwise, if a QoS queue is found to have the highest relative priority, then processing branches to step 470.

At step 460, the tie is resolved by performing round robin or LRU scheduling. That is, until the QoS categories are evaluated, the QoS queues having the same priority will be rotated through in a predetermined order or scheduled such that the QoS queue that has not provided a packet for transmission recently will be given such an opportunity. After selecting a QoS queue in this manner, processing continues with step 470.

At step 470, a packet is dequeued from the selected QoS queue and the packet is transmitted by the port at step 480. This scheduling process may be repeated by looping back to step 410, as illustrated.

Queuing Schemes

A variety of different queuing mechanisms may be implemented using various combinations of the QoS profile attributes discussed above. Table 2 below illustrates how to achieve exemplary queuing mechanisms and corresponding configurations of the QoS profile attributes.

TABLE 2

Queuing Mechanism Configurations

| Queuing Mechanism | QoS Profile Attribute Value |
|---|---|
| Strict Priority Queuing | Minimum Bandwidth = 0% |
| | Maximum Bandwidth = 100% |
| | Peak Bandwidth = 100% |
| | Maximum Delay = N/A |
| | Relative Priority = PRIORITY$_i$ |
| Round Robin/Least Recently Used Queuing | Minimum Bandwidth = 0% |
| | Maximum Bandwidth = 100% |
| | Peak Bandwidth = 100% |
| | Maximum Delay = N/A |
| | Relative Priority = <same for all queues> |
| Weighted Fair Queuing | Minimum Bandwidth = >0% |
| | Maximum Bandwidth = MAX_BW$_i$ |
| | Peak Bandwidth = PEAK_BW$_i$ |
| | Maximum Delay = N/A |
| | Relative Priority = <same for all queues> |

PRIORITY$_i$ represents a programmable priority value for a particular QoS queue, i. Similarly, MAX_BW$_i$ and PEAK_BW$_i$ represent programmable maximum bandwidths and peak bandwidths, respectively, for a particular QoS queue, i.

For a strict priority scheme, each QoS queue's minimum bandwidth is set to zero percent, each QoS queue's maximum bandwidth is set to one hundred percent, and each QoS queue's peak is set to one hundred percent. In this manner, the current bandwidth will never be less than the minimum bandwidth, and the current bandwidth will never exceed either the peak bandwidth or the maximum bandwidth. In this configuration, all QoS queues will be associated with Category B since no QoS queues will satisfy the criteria of either Category A or Category B. Ultimately, by configuring the QoS profile attributes in this manner, the second level of arbitration (e.g., the relative priority of the QoS queues) determines which QoS queue is to source the next packet.

For a pure round robin or least recently used (LRU) scheme, the QoS profile attributes are as above, but additionally all QoS queue priorities are set to the same value. In this manner, the third level of arbitration determines which QoS queue is to source the next packet.

Finally, weighted fair queuing can be achieved by assigning, at least, a value greater than zero percent to the desired minimum bandwidth. By assigning a value greater than zero to the minimum bandwidth parameter, the particular QoS queue is assured to get at least that amount of bandwidth on average because the QoS queue will be associated with Category A until at least its minimum bandwidth is satisfied. Additionally, different combinations of values may be assigned to the peak and maximum bandwidths to prevent a particular QoS queue from monopolizing the link.

Alternative Embodiments

While evaluation of QoS categories has been described above as occurring periodically, this evaluation may also be triggered by the occurrence of a predetermined event. Alternatively, evaluation of QoS categories may take place as part of the scheduling processing rather than as part of a separate periodic background process.

While a relationship between the number of priority levels and the number of QoS queues has been suggested above, it is appreciated that the number of QoS queues may be determined independently of the number of priority levels. Further, it is appreciated that the number of QoS queues provided at each port may be fixed for every port or alternatively a variable number of QoS queues may be provided for each port.

Finally, in alternative embodiments, weighting factors and ratios other than those suggested herein may be used to adjust the current bandwidth calculation for a particular implementation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for bandwidth management in a packet forwarding device, comprising:
   identifying a quality of service (QoS) metric corresponding to a traffic group, the QoS metric defining a minimum QoS for the traffic group;
   receiving a data packet associated with the traffic group;
   placing the data packet into one of a plurality of queues;
   identifying a current measure of network performance with respect to parameters specified in the QoS metric; and
   removing the data packet from the queue if a difference between the current measure and the minimum QoS falls within a threshold.

2. The method of claim 1 wherein identifying the QoS metric corresponding to a traffic group further comprises:
   identifying the traffic group through an Internet Protocol (IP) subnet membership identifier; and
   determining a corresponding QoS metric defining a minimum QoS for the traffic group.

3. The method of claim 1 wherein identifying the QoS metric corresponding to a traffic group further comprises:
   identifying the traffic group through a media access control (MAC) address; and
   determining a corresponding QoS metric defining a minimum QoS for the traffic group.

4. The method of claim 1 wherein identifying the QoS metric corresponding to a traffic group further comprises:
   identifying the traffic group through a virtual local area network (VLAN) identifier; and
   determining a corresponding QoS metric defining a minimum QoS for the traffic group.

5. The method of claim 1 wherein identifying the QoS metric comprises receiving information indicating a minimum bandwidth for the traffic group.

6. The method of claim 1 wherein identifying the QoS metric comprises receiving information indicating a maximum sustained bandwidth for the traffic group.

7. The method of claim 6 wherein identifying the QoS metric comprises receiving information indicating a peak bandwidth representing a bandwidth in excess of the maximum sustained bandwidth that the traffic group can utilize.

8. The method of claim 1 wherein identifying the QoS metric comprises receiving information indicating a maximum allowable delay for the traffic group.

9. The method of claim 1 wherein identifying the QoS metric comprises receiving information indicating a relative priority associated with the traffic group.

10. The method of claim 1 wherein determining a current measure of network performance occurs at specified intervals of time.

11. The method of claim 1 wherein determining a current measure of network performance with respect to parameters specified in the QoS metric comprises calculating the current measure for the parameters specified in the QoS metric.

12. The method of claim 1 wherein receiving the data packet comprises receiving the data packet on a first port of a plurality of ports, and wherein removing the data packet from the queue comprises transmitting the data packet from a second port of the plurality of ports.

13. The method of claim 1 wherein the packet forwarding device employs a non-deterministic access protocol.

14. The method of claim 13 wherein the non-determninistic access protocol employed by the packet forwarding device is the Carrier Sense Multiple Access with Collision Detection (CSMA/CD) protocol.

15. An article of manufacture comprising a machine accessible medium having content that when accessed provides instructions to cause an electronic system to:
   identify a quality of service (QoS) metric corresponding to a traffic group, the QoS metric defining a minimum QoS for the traffic group;
   receive a data packet associated with the traffic group;
   place the data packet into one of a plurality of queues;
   identify a current measure of network performance with respect to parameters specified in the QoS metric; and
   remove the data packet from the queue if a difference between the current measure and the minimum QoS falls within a threshold.

16. The article of manufacture of claim 15 wherein the content to provide instructions to cause the electronic system to identify the QoS metric corresponding to a traffic group further comprises the content to provide instructions to cause the electronic system to:

identify the traffic group through an Internet Protocol (IP) subnet membership identifier; and determine a corresponding QoS metric defining a minimum QoS for the traffic group.

17. The article of manufacture of claim 15 wherein the content to provide instructions to cause the electronic system to identify the QoS metric corresponding to a traffic group further comprises the content to provide instructions to cause the electronic system to:

identify the traffic group through a media access control (MAC) address; and determine a corresponding QoS metric defining a minimum QoS for the traffic group.

18. The article of manufacture of claim 15 wherein the content to provide instructions to cause the electronic system to identify the QoS metric corresponding to a traffic group further comprises the content to provide instructions to cause the electronic system to:

identify the traffic group through a virtual local area network (VLAN) identifier; and determine a corresponding QoS metric defining a minimum QoS for the traffic group.

19. The article of manufacture of claim 15 wherein the content to provide instructions to cause the electronic system to identify the QoS metric comprises the content to provide instructions to cause the electronic system to receive information indicating a minimum bandwidth for the traffic group.

20. The article of manufacture of claim 15 wherein the content to provide instructions to cause the electronic system to identify the QoS metric comprises the content to provide instructions to cause the electronic system to receive information indicating a maximum sustained bandwidth for the traffic group.

21. The article of manufacture of claim 20 wherein the content to provide instructions to cause the electronic system to identify the QoS metric comprises the content to provide instructions to cause the electronic system to receive information indicating a peak bandwidth representing a bandwidth in excess of the maximum sustained bandwidth that the traffic group can utilize.

22. The article of manufacture of claim 15 wherein the content to provide instructions to cause the electronic system to identify the QoS metric comprises the content to provide instructions to cause the electronic system to receive information indicating a maximum allowable delay for the traffic group.

23. The article of manufacture of claim 15 wherein the content to provide instructions to cause the electronic system to identify the QoS metric comprises the content to provide instructions to cause the electronic system to receive information indicating a relative priority associated with the traffic group.

24. The article of manufacture of claim 15 wherein the content to provide instructions to cause the electronic system to determine a current measure of network performance comprises the content to provide instructions to cause the electronic system to determine the current measure at specified intervals of time.

25. The article of manufacture of claim 15 wherein the content to provide instructions to cause the electronic system to determine a current measure of network performance with respect to parameters specified in the QoS metric comprises the content to provide instructions to cause the electronic system to calculate the current measure for the parameters specified in the QoS metric.

26. The article of manufacture of claim 15 wherein the content to provide instructions to cause the electronic system to receive the QoS metric comprises the content to provide instructions to cause the electronic system to receive the data packet on a first port of a plurality of ports, and wherein the content to provide instructions to cause the electronic system to remove the data packet from the queue comprises the content to provide instructions to cause the electronic system to transmit the data packet from a second port of the plurality of ports.

27. The article of manufacture of claim 15 wherein the packet forwarding device employs a non-deterministic access protocol.

28. The article of manufacture of claim 27 wherein the non-deterministic access protocol employed by the packet forwarding device is the Carrier Sense Multiple Access with Collision Detection (CSMA/CD) protocol.

* * * * *

(12) EX PARTE REEXAMINATION CERTIFICATE (8750th)
United States Patent
Haddock et al.

(10) Number: US 6,678,248 C1
(45) Certificate Issued: Dec. 13, 2011

(54) POLICY BASED QUALITY OF SERVICE

(75) Inventors: Stephen R. Haddock, Los Gatos, CA (US); Justin N. Chueh, Palo Alto, CA (US); Shehzad T. Merchant, Mountain View, CA (US); Andrew H. Smith, Palo Alto, CA (US); Michael Yip, Sunnyvale, CA (US)

(73) Assignee: Extreme Networks, Cupertino, CA (US)

Reexamination Request:
No. 90/010,432, Mar. 3, 2009

Reexamination Certificate for:
Patent No.: 6,678,248
Issued: Jan. 13, 2004
Appl. No.: 09/597,878
Filed: Jun. 20, 2000

Related U.S. Application Data

(63) Continuation of application No. 09/018,103, filed on Feb. 3, 1998, now Pat. No. 6,104,700.
(60) Provisional application No. 60/057,371, filed on Aug. 29, 1997.

(51) Int. Cl.
*H04L 12/56* (2006.01)

(52) U.S. Cl. .................. 370/235; 370/412; 370/429
(58) Field of Classification Search .................. None
See application file for complete search history.

(56) References Cited

To view the complete listing of prior art documents cited during the proceeding for Reexamination Control Number 90/010,432, please refer to the USPTO's public Patent Application Information Retrieval (PAIR) system under the Display References tab.

*Primary Examiner* — Scott L. Weaver

(57) ABSTRACT

A flexible, policy-based, mechanism for managing, monitoring, and prioritizing traffic within a network and allocating bandwidth to achieve true quality of service (QoS) is provided. According to one aspect of the present invention, a method is provided for managing bandwidth allocation in a network that employs a non-deterministic access protocol, such as an Ethernet network. A packet forwarding device receives information indicative of a set of traffic groups, such as: a MAC address, or IEEE 802.1p priority indicator or 802.1Q frame tag, if the QoS policy is based upon individual station applications; or a physical port if the QoS policy is based purely upon topology. The packet forwarding device additionally receives bandwidth parameters corresponding to the traffic groups. After receiving a packet associated with one of the traffic groups on a first port, the packet forwarding device schedules the packet for transmission from a second port based upon bandwidth parameters corresponding to the traffic group with which the packet is associated. According to another aspect of the present invention, a method is provided for managing bandwidth allocation in a packet forwarding device. The packet forwarding device receives information indicative of a set of traffic groups. The packet forwarding device additionally receives information defining a QoS policy for the traffic groups. After a packet is received by the packet forwarding device, a traffic group with which the packet is associated is identified. Subsequently, rather than relying on an end-to-end signaling protocol for scheduling, the packet is scheduled for transmission based upon the QoS policy for the identified traffic group.

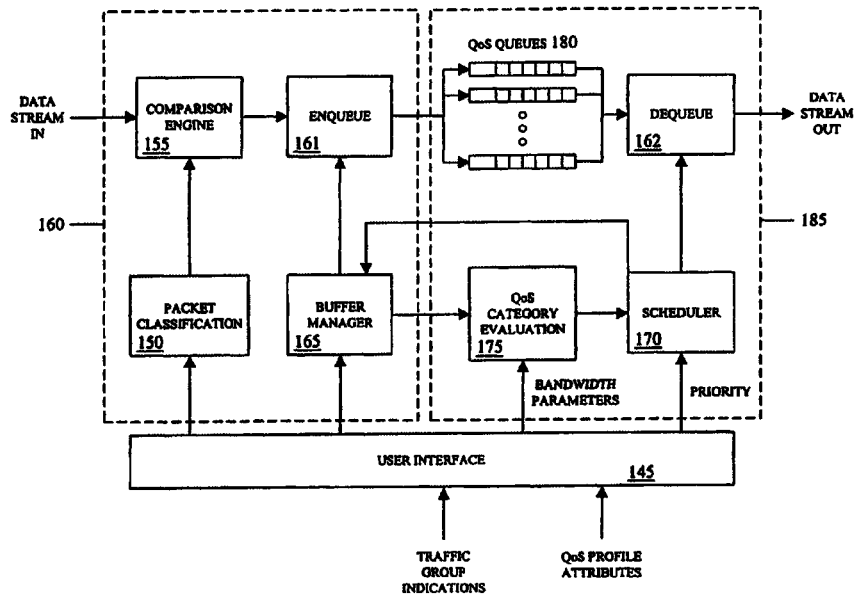

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-28 is confirmed.

* * * * *

(12) EX PARTE REEXAMINATION CERTIFICATE (9862nd)
United States Patent
Haddock et al.

(10) Number: US 6,678,248 C2
(45) Certificate Issued: Oct. 4, 2013

(54) POLICY BASED QUALITY OF SERVICE

(75) Inventors: Stephen R. Haddock, Los Gatos, CA (US); Justin N. Chueh, Palo Alto, CA (US); Shehzad T. Merchant, Mountain View, CA (US); Andrew H. Smith, Palo Alto, CA (US); Michael Yip, Sunnyvale, CA (US)

(73) Assignee: Extreme Networks, Cupertino, CA (US)

Reexamination Request:
No. 90/012,013, Nov. 17, 2011

Reexamination Certificate for:
Patent No.: 6,678,248
Issued: Jan. 13, 2004
Appl. No.: 09/597,878
Filed: Jun. 20, 2000

Reexamination Certificate C1 6,678,248 issued Dec. 13, 2011

Related U.S. Application Data

(63) Continuation of application No. 09/018,103, filed on Feb. 3, 1998, now Pat. No. 6,104,700.

(60) Provisional application No. 60/057,371, filed on Aug. 29, 1997.

(51) Int. Cl.
*H04L 12/56* (2011.01)

(52) U.S. Cl.
USPC ............ 370/235; 370/412; 370/429

(58) Field of Classification Search
None
See application file for complete search history.

(56) References Cited

To view the complete listing of prior art documents cited during the proceeding for Reexamination Control Number 90/012,013, please refer to the USPTO's public Patent Application Information Retrieval (PAIR) system under the Display References tab.

*Primary Examiner* — Jeffrey Carlson

(57) ABSTRACT

A flexible, policy-based, mechanism for managing, monitoring, and prioritizing traffic within a network and allocating bandwidth to achieve true quality of service (QoS) is provided. According to one aspect of the present invention, a method is provided for managing bandwidth allocation in a network that employs a non-deterministic access protocol, such as an Ethernet network. A packet forwarding device receives information indicative of a set of traffic groups, such as: a MAC address, or IEEE 802.1p priority indicator or 802.1Q frame tag, if the QoS policy is based upon individual station applications; or a physical port if the QoS policy is based purely upon topology. The packet forwarding device additionally receives bandwidth parameters corresponding to the traffic groups. After receiving a packet associated with one of the traffic groups on a first port, the packet forwarding device schedules the packet for transmission from a second port based upon bandwidth parameters corresponding to the traffic group with which the packet is associated. According to another aspect of the present invention, a method is provided for managing bandwidth allocation in a packet forwarding device. The packet forwarding device receives information indicative of a set of traffic groups. The packet forwarding device additionally receives information defining a QoS policy for the traffic groups. After a packet is received by the packet forwarding device, a traffic group with which the packet is associated is identified. Subsequently, rather than relying on an end-to-end signaling protocol for scheduling, the packet is scheduled for transmission based upon the QoS policy for the identified traffic group.

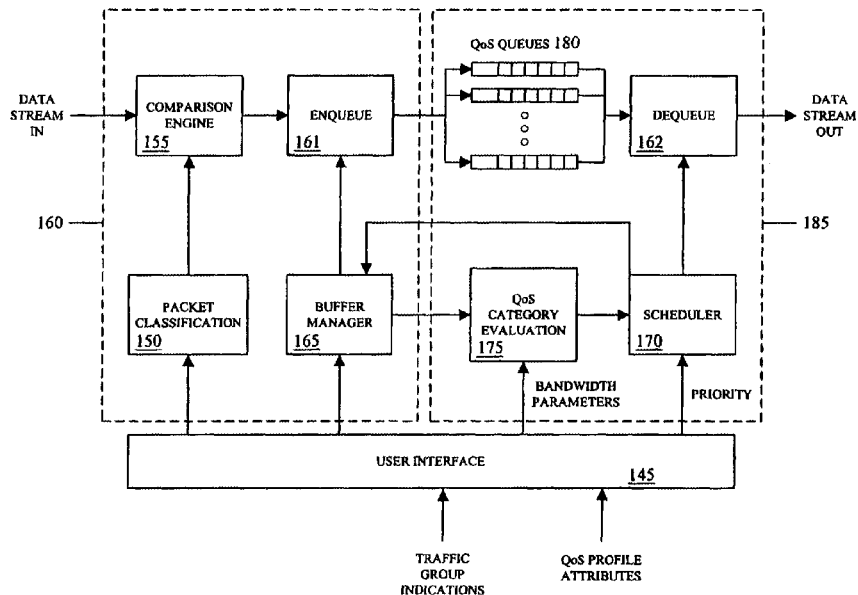

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-28 is confirmed.

* * * * *